(12) United States Patent
Fischer et al.

(10) Patent No.: US 6,479,617 B1
(45) Date of Patent: Nov. 12, 2002

(54) MOLDING MATERIALS FOR USE IN MOTOR VEHICLE INTERIORS, COMPOSITES CONTAINING THE SAME, AND THEIR RECYCLATES

(75) Inventors: Michael Fischer, Ludwigshafen (DE); Graham Edmund Mc Kee, Neustadt (DE); Gerd Blinne, Bobenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/959,149

(22) PCT Filed: Apr. 11, 2000

(86) PCT No.: PCT/EP00/03209

§ 371 (c)(1),
(2), (4) Date: Oct. 18, 2001

(87) PCT Pub. No.: WO00/64974

PCT Pub. Date: Nov. 2, 2000

(30) Foreign Application Priority Data

Apr. 26, 1999 (DE) .......................................... 199 18 912

(51) Int. Cl.⁷ .............................................. C08G 64/00
(52) U.S. Cl. ......................... 528/198; 528/196; 525/67
(58) Field of Search ................................ 528/196, 198; 525/67

(56) References Cited

U.S. PATENT DOCUMENTS 4,535,124 A * 8/1985 Binsack et al.
4,912,163 A * 3/1990 Lausberg et al.

FOREIGN PATENT DOCUMENTS

| DE | 0643104 | * | 3/1995 |
| EP | 643 104 | | 3/1995 |
| WO | 00/44831 | | 8/2000 |
| WO | 00/47677 | | 8/2000 |
| WO | 00/47678 | | 8/2000 |

OTHER PUBLICATIONS

Pat.Abst.Japan,07173363/Nov. 7, 1995.

* cited by examiner

Primary Examiner—Terressa M. Boykin
(74) Attorney, Agent, or Firm—Keil & Weinkauf

(57) ABSTRACT

The present invention relates to molding compositions comprising polycondensates, particulate graft copolymers, copolymer made from vinylaromatic monomer and acrylonitrile and/or methacrylonitrile, fibers, polycarbonate, carbon black and customary additives. Moldings and composites made from this molding composition are described as are recycled materials from these, and the use of the molding compositions, moldings, composites and recycled materials.

7 Claims, No Drawings

MOLDING MATERIALS FOR USE IN MOTOR VEHICLE INTERIORS, COMPOSITES CONTAINING THE SAME, AND THEIR RECYCLATES

The invention relates to fiber-reinforced molding compositions, moldings and composites made therefrom, and to recycled materials made from these, and also to the use of the molding compositions, moldings, composites and recycled materials.

Moldings made from polymeric materials and used in particular in motor vehicle interiors have to meet high requirements, especially with respect to their mechanical properties, their surface properties, their aging performance, and also their odor and emission performance. A variety of polymeric materials has hitherto been used to produce moldings for interior applications in motor vehicles.

Another material used is glass-fiber-reinforced ABS/PC (a polymer blend made from acrylonitrile-butadiene-styrene copolymer and polycarbonate). However, this material has unsatisfactory UV resistance, poor flowability, poor heat-aging performance (toughness and elongation at break after heat-aging), disadvantageous surface properties, poor foam adhesion and also in particular poor odor performance. For the purposes of the present invention, odor performance is the tendency of materials, after a specified duration of aging under particular temperature and climatic conditions, to give off volatile constituents which have a discernible odor.

Another material used is glass-fiber-reinforced, impact-modified SMA (styrene-maleic anhydride copolymer). SMA, too, has unsatisfactory surface properties, poor heat-aging resistance, and in particular low heat resistance and poor odor performance.

Another material used to produce moldings for motor vehicle interiors is PPE/HIPS GF (a polymer blend made from polyphenylene ether and high-impact polystyrene and also glass fibers). Disadvantages of this material are poor flowability, poor UV resistance and heat-aging resistance, and also poor odor performance.

Another material suitable for motor vehicle interior applications is PP/mineral/EPDM. This is a polymer blend composed of polypropylene, a mineral filler and an ethylene-propylene-diene terpolymer. This material, too, has low stiffness, poor foam adhesion and poor paintability.

Other than mineral-reinforced PP, the abovementioned materials also have poor heat resistance, apparent in a low Vicat B softening point (Vicat B<130° C.). Good heat resistance and heat-aging resistance of the materials used is, however, desirable since the temperature of the motor vehicle interior can rise considerably, especially when exposed to solar radiation.

It is an object of the present invention to provide molding compositions suitable for producing moldings which are used in the interior of motor vehicles and have an advantageous property profile in terms of their mechanical, optical and sensory properties, and also in particular have good heat resistance and heat-aging resistance, and good emission performance and/or odor performance. The molding compositions should also have a very low density. The low density is particularly advantageous with respect to fuel saving in motor vehicles. Laser marking is also desirable, preferably laser inscription of the surface of the molding composition. This allows the surface to be modified in a way which is industrially simple and very precise.

We have found that this object is achieved by a fiber-reinforced molding composition comprising, based on the total of components A to I, which overall is 100% by weight, a) as component A, at least one polycondensate as a constituent which brings the total to 100% by weight of the molding composition,
b) as component B, from 1 to 15% by weight of at least one particulate graft copolymer whose soft phase has a glass transition temperature below 0° C. and whose median particle size is from 50 to 1000 nm,
c) as component C, from 0 to 15% by weight of at least one copolymer made from the following monomers
 c1) as component C1, from 50 to 90% by weight of at least one vinylaromatic monomer, and
 c2) as component C2, from 10 to 50% by weight of acrylonitrile and/or methacrylonitrile, based in each case on component C,
d) as component D, from 0 to 20% by weight of fibers,
e) as component E, from 0.01 to 15% by weight of a polycarbonate,
f) as component F, from 0 to 2% by weight of a carbon black,
g) as component G, from 0.01 to 15% by weight of a polymer other than component B,
h) as component H, from 0 to 20% by weight of a polyester other than component A,
i) as component I, from 0 to 10% by weight of customary additives, such as UV stabilizers, pigments, oxidation retarders—lubricants and mold-release agents.

In one embodiment of the novel fiber-reinforced molding composition no component C is present. In another preferred embodiment of the fiber-reinforced molding composition no component D is present. Another preferred embodiment of the fiber-reinforced molding composition comprises no component F. Yet another preferred embodiment of the fiber-reinforced molding composition comprises no component H. In another embodiment of the fiber-reinforced molding composition none of components C, D, F and H are present. Another preferred embodiment of the novel molding composition comprises at least component C, but not components D, F and H.

As component A, the constituent which makes up the remainder to give 100% by weight of the molding composition, the novel molding composition preferably comprises from 20 to 75% by weight, particularly preferably from 30 to 60% by weight, of a preferably fusible polycondensate, preferably a polyester and particularly preferably an aromatic polyester. The polycondensate present in the novel molding compositions are known per se. The polycondensates preferably have a viscosity number of from 40 to 135, with preference from 70 to 130 and particularly preferably from 80 to 110.

The polyester polycondensates may preferably be prepared by reacting terephthalic acid, its esters or other ester-forming derivatives, with 1,4-butanediol, 1,3-propanediol or, respectively, 1,2-ethanediol, in a manner known per se.

Up to 20 mol % of the terephthalic acid may be replaced by other dicarboxylic acids. Those which may be mentioned, merely as examples, are naphthalenedicarboxylic acids, isophthalic acid, adipic acid, azelaic acid, sebacic acid, dodecanedioic acid and cyclohexanedicarboxylic acids, mixtures of these carboxylic acids, and ester-forming derivatives of the same.

Up to 20 mol % of the dihydroxy compounds 1,4-butanediol, 1,3-propanediol or, respectively, 1,2-ethanediol may also be replaced by other dihydroxy compounds, e.g. 1,6-hexanediol, 1,4-hexanediol, 1,4-cyclohexanediol, 1,4-di (hydroxymethyl)cyclohexane, bisphenol A, neopentyl glycol, mixtures of these diols, or also ester-forming derivatives of the same.

Other preferred aromatic polyesters are polytrimethylene terephthalate (PTT) and in particular polybutylene terephthalate (PBT), whose formation involves exclusively terephthalic acid and the appropriate diols 1,2-ethanediol, 1,3-propanediol and 1,4-butanediol. Some or all of the aromatic polyesters may be used in the form of recycled polyester materials, such as PET regrind from bottle material (post-consumer) or from wastes from bottle production (post-industrial).

In a particularly preferred embodiment component A is composed of
- a1) from 60 to 100% by weight, preferably from 80 to 100% by weight, particularly preferably from 90 to 99.9% by weight of polybutylene terephthalate (A1) and
- a2) from 0 to 40% by weight, preferably from 0 to 20%, particularly preferably from 0.1 to 10% by weight, of another polycondensate.

If component A has constituent A1 it is particularly preferable for A1 to have a viscosity number of from 60 to 135, preferably from 70 to 130, particularly preferably from 80 to 100 and with particular preference from 85 to 95.

In another embodiment of the invention the molding composition comprises no PET. Preference is moreover given to molding compositions in which component A is PET-free.

The novel molding composition comprises, as component B, from 1 to 15% by weight, preferably from 4 to 10% by weight, particularly preferably from 5 to 8% by weight, of at least one particulate graft copolymer with a glass transition temperature of the soft phase below 0° C. and with a median particle size of from 50 to 1000 nm.

Component B is preferably a graft copolymer made from
- b1) from 50 to 90% by weight of a particulate graft base B1 with a glass transition temperature below 0° C., and
- b2) from 10 to 50% by weight of a graft B2 made from the following monomers
    - b21) as component B21, from 50 to 90% by weight of a vinylaromatic monomer, and
    - b22) as component B22, from 10 to 50% by weight of acrylonitrile and/or methacrylonitrile.

The particulate graft base B1 may be composed of from 70 to 100% by weight of a $C_1$–$C_{10}$ conjugated preferably of a $C_1$–$C_{10}$-alkyl acrylate, diene and from 0 to 30% by weight of a bifunctional monomer having two non-conjugated olefinic double bonds. Graft bases of this type are used, for example, as component B in ABS polymers or MBS polymers.

In a preferred embodiment of the invention the graft base B1 is composed of the following monomers:
- b11) as component B11, from 75 to 99.9% by weight of a $C_1$–$C_{10}$-alkyl acrylate,
- b12) as component B12, from 0.1 to 10% by weight of at least one polyfunctional monomer having at least two non-conjugated olefinic double bonds, and
- b13) as component B13, from 0 to 24.9% by weight of one or more other copolymerizable monomers.

The graft base B1 is an elastomer whose glass transition temperature is preferably below −20° C., particularly preferably below −30° C.

The preferred monomers B11 used to prepare the elastomer are acrylates having from 1 to 10 carbon atoms, in particular from 4 to 8 carbon atoms, in the alcohol component. Particularly preferred monomers B11 are isobutyl acrylate and n-butyl acrylate, and also 2-ethylhexyl acrylate, particularly preferably n-butyl acrylate.

Besides the acrylates, the crosslinking monomer B12 used is from 0.1 to 10% by weight, preferably from 0.1 to 5% by weight, particularly preferably from 1 to 4% by weight, of a polyfunctional monomer having at least two non-conjugated olefinic double bonds. Examples of these are divinylbenzene, diallyl fumarate, diallyl phthalate, triallyl cyanurate, triallyl isocyanurate, tricyclodecenyl acrylate and dihydrodicyclopentadienyl acrylate, particularly preferably the latter two.

Besides the monomers B11 and B12, the structure of the graft base B1 may also involve up to 24.9% by weight, preferably up to 20% by weight, of other copolymerizable monomers, preferably 1,3-butadiene, styrene, α-methylstyrene, acrylonitrile, methacrylonitrile and $C_1$–$C_8$-alkyl methacrylates, or mixtures of these monomers. In a particularly preferred embodiment no 1,3-butadiene is present in the graft base B1, and the graft base B1 in particular is composed exclusively of components B11 and B12.

Grafted onto the graft base B1 there is a graft B2 made from the following monomers:
- b21) as component B21, from 50 to 90% by weight, preferably from 60 to 90% by weight, particularly preferably from 65 to 80% by weight, of a vinylaromatic monomer, and
- b22) as component B22, from 10 to 50% by weight, preferably from 10 to 40% by weight, particularly preferably from 20 to 35% by weight, of acrylonitrile or methacrylonitrile or mixtures of these.

Examples of vinylaromatic monomers are unsubstituted styrene and substituted styrenes, such as α-methylstyrene, p-chlorostyrene and p-chloro-α-methylstyrene. Preference is given to unsubstituted styrene and α-methylstyrene, particularly preferably unsubstituted styrene.

In one embodiment of the invention the median particle size of component B is from 50 to 200 nm, preferably from 55 to 150 nm, and particularly preferably from 90 to 110 nm.

In another embodiment of the invention the median particle size of component B is from 200 to 1000 nm, preferably from 400 to 550 nm.

In a particularly preferred embodiment of the invention component B has bimodal particle size distribution and is composed of from 10 to 90% by weight, preferably from 30 to 90% by weight, particularly preferably from 50 to 75% by weight, of a fine-particle graft copolymer with a median particle size of from 50 to 200 nm, preferably from 55 to 150 nm, and from 10 to 90% by weight, preferably from 10 to 70% by weight, particularly preferably from 25 to 50% by weight, of a coarse-particle graft copolymer with a median particle size of from 250 to 1000 nm, preferably from about 400 to 550 nm.

The median particle size and particle size distribution given are the sizes determined from the integral mass distribution. The median particle sizes according to the invention are in all cases the ponderal median of the particle sizes. The determination of these is based on the method of W. Scholtan and H. Lange, Kolloid-Z. und Z.-Polymere 250 (1972), pages 782–796, using an analytical ultracentrifuge. The ultracentrifuge measurement gives the integral mass distribution of particle diameters in a specimen. From this it is possible to deduce what percentage by weight of the particles has a diameter identical to or smaller than a particular size. The median particle diameter, which is also termed the $d_{50}$ of the integral mass distribution, is defined here as the particle diameter at which 50% by weight of the particles have a diameter smaller than that corresponding to the $d_{50}$. Equally, 50% by weight of the particles then have a larger diameter than the $d_{50}$. To describe the breadth of the particle size distribution of the rubber particles, $d_{10}$ and $d_{90}$ values given by the integral mass distribution are utilized alongside the $d_{50}$ value (median particle diameter). The $d_{10}$ and $d_{90}$ of the integral mass distribution are defined similarly to the $d_{50}$ with the difference that they are based on, respectively, 10 and 90% by weight of the particles. The quotient $$(d_{90}-d_{10})/d_{50}=Q$$

is a measure of the breadth of the particle size distribution. Emulsion polymers A which can be used according to the invention as component A preferably have Q less than 0.5, in particular less than 0.35.

The graft copolymer B generally has one or more stages, i.e. it is a polymer composed of a core and of one or more shells. The polymer is composed of a base (graft core) B1 and of, grafted onto this, one, or preferably more than one, stages B2 (graft), known as grafts or graft shells.

By grafting one or more times it is possible to apply one or more graft shells to the rubber particles. Each graft shell may have a different makeup. In addition to the grafting monomers and together with these, polyfunctional crosslinking monomers or monomers containing reactive groups may be grafted on (see, for example, EP-A 0 230 282, DE-A 36 01 419, EP-A/0 269 861).

In one embodiment of the invention crosslinked acrylate polymers with a glass transition temperature below 0° C. serve as graft base B1. The crosslinked acrylate polymers should preferably have a glass transition temperature below −20° C., in particular below −30° C.

In principle the structure of the graft copolymer may also have two or more layers, where at least one inner layer has a glass transition temperature below 0° C. and the outermost layer should have a glass transition temperature above 23° C.

In a preferred embodiment the graft B2 is composed of at least one graft shell. The outermost graft shell of these has a glass transition temperature above 30° C. A polymer formed from the monomers of the graft B2 would have a glass transition temperature above 80° C.

Suitable preparation processes for graft copolymers B are emulsion, solution, bulk and suspension polymerization. The graft copolymers B are preferably prepared by free-radical emulsion polymerization, at temperatures of from 20 to 90° C. using water-soluble and/or oil-soluble initiators, such as peroxodisulfate or benzyl peroxide, or with the aid of redox initiators. Redox initiators are also suitable for polymerization below 20° C.

Suitable emulsion polymerization processes are described for example in DE-A-28 26 925, DE-A 31 49 358 and in DE-C-12 60 135.

The graft shells are preferably built up in the emulsion polymerization process as described in DE-A-32 27 555, 31 49 357, 31 49 358 and 34 14 118. The specified setting of the particle sizes according to the invention at from 50 to 1000 nm preferably takes place by the methods described in DE-C-12 60 135 and DE-A-28 26 925, or in Applied Polymer Science, Vol. 9 (1965), page 2929. The use of polymers with different particle sizes is known, for example, from DE-A-28 26 925 and U.S. Pat. No. 5,196,480.

The novel molding compositions comprise, as component C, from 0 to 15% by weight, preferably from 4 to 10% by weight, particularly preferably from 5 to 8% by weight, of a copolymer made from the following monomers:

c1) as component C1, from 75 to 90% by weight, preferably from 77 to 90% by weight, particularly preferably from 81 to 80% by weight, of at least one vinylaromatic monomer, and c2) as component C2, from 10 to 25% by weight, preferably from 10 to 20% by weight, particularly preferably from 10 to 19% by weight, in particular from 17 to 19% by weight, of acrylonitrile and/or methacrylonitrile.

Suitable vinylaromatic monomers are the abovementioned monomers C1 and the vinylaromatic monomers mentioned above as component B21. Component C is preferably an amorphous polymer as described above for graft B2. In one embodiment of the invention component C comprises a copolymer of styrene and/or α-methylstyrene with acrylonitrile. The acrylonitrile content in these copolymers of component C here is not above 25% by weight and is generally from 10 to 25% by weight, preferably from 10 to 20% by weight, particularly preferably from 15 to 19% by weight, in particular from 17 to 19% by weight. Component C also includes the free, ungrafted styrene-acrylonitrile copolymers produced during the graft copolymerization to prepare component B. Depending on the conditions selected in the graft copolymerization for preparing the graft copolymer B, it is possible that a sufficient proportion of component C may already have been formed during the graft copolymerization. However, it will generally be necessary for the products obtained during the graft copolymerization to be blended with additional and separately prepared component C.

This additional and separately prepared component C may preferably be a styrene-acrylonitrile copolymer, an α-methylstyrene-acrylonitrile copolymer or an α-methylstyrene-styrene-acrylonitrile terpolymer. It is important that the acrylonitrile content in the copolymers C does not exceed 25% by weight, in particular 19% by weight. The copolymers may be used for component C either individually or as a mixture, and the additional and separately prepared component C of the novel molding compositions may, for example, therefore be a mixture of a styrene-acrylonitrile copolymer (PSAN) and an α-methylstyrene-acrylonitrile copolymer. The acrylonitrile content of the different copolymers of component C may also vary. However, component C is preferably composed simply of one or more styrene-acrylonitrile copolymers, which may have differing acrylonitrile contents. In a particularly preferred embodiment component C is composed simply of one styrene-acrylonitrile copolymer.

The novel molding compositions comprise, as component D, from 0 to 20% by weight, preferably from 1 to 20% by weight, particularly preferably from 5 to 17.5% by weight, in particular from 10 to 15% by weight, of fibers. These are commercially available products.

In the molding composition these generally have an average length of from 0.1 to 0.5 mm, preferably from 0.1 to 0.4 mm, and diameter of from 6 to 20 □m. Preference is given to glass fibers and mineral fibers, in particular glass fibers, preferably made from E glass. To achieve better adhesion the fibers may have been coated with organosilanes, with epoxysilanes or with other polymer coatings.

The novel molding compositions comprise, as component E, based on the molding composition, from 0.01 to 15% by weight, and preferably from 0.1 to 12% by weight and particularly preferably from 4 to 8% by weight, of a polycarbonate. Suitable polycarbonates are any of those known to the skilled worker, and fusible polycarbonates are particularly suitable. In this connection reference is made to "Polymer Chemistry, An Introduction", 2nd Edition, Malcolm P. Stevens Oxford University Press, 1990, pp. 400–403 and "Principles of Polymerisation", 2nd Edition, George Odian, Wiley Interscience Publications, John Wiley and Sons, 1981, pp. 146–149. Particularly suitable polycarbonates have high flowability, preferably an MVR of >9, with preference >15 and particularly preferably >20 at 300° C. and 1.2 kg. Preferred components E have an MVR of not more than 100 cm$^3$/10 mn, preferably not more than 90 cm$^3$/10 min and particularly preferably not more than 50 cm$^3$/10 min. A particularly preferred component E is Lexan 121R from General Electric Plastics. The use of recycled PC material in the form of either "post-industrial" or "post-consumer" recycled material has proven particularly suitable, since it processes particularly well.

The novel molding compositions also comprise, as component F, based on the molding composition, from 0 to 2% by weight, preferably from 0.01 to 2% by weight, particularly preferably from 0.1 to 0.5% by weight and more preferably from 0.1 to 0.3% by weight, of a carbon black. According to the invention any carbon black known to the skilled worker is suitable as component F. Particular preference is given to acetylene black or carbon black produced by the combustion of tar, tar oils or naphthalene, or of natural gas rich in hydrocarbons or of mineral oil residues with less than the required amount of air feed or, respectively, with rapid cooling of the combustion gases. The laser-markability, in particular laser-inscribability, of the novel molding compositions is made possible with high contrast by their carbon black content.

The novel molding compositions may comprise, as component G, from 0.01 to 15% by weight, preferably from 0.1 to 10% by weight and particularly preferably from 3 to 8% by weight, of polymers other than B and preferably homogeneously miscible with components A and/or C, or dispersible in these. Customary (grafted) rubbers may preferably be used, such as ethylene-vinyl acetate rubbers, silicone rubbers, thermoplastic polyurethanes, polyether rubbers, polyetherester rubbers, hydrogenated diene rubbers, polyalkenamer rubbers, acrylate rubbers, ethylene-propylene rubbers, ethylene-propylene-diene rubbers and butyl rubbers, methyl methacrylate-butadiene-styrene (MBS) rubbers or methyl methacrylate-butyl acrylate-styrene rubbers, preferably with the proviso that these are miscible with the mixed phase formed from components A, B and C or are dispersible therein. Preference is given to using acrylate rubbers, ethylene-propylene (EP) rubbers or ethylene-propylene-diene (EPDM) rubbers, in particular in the form of graft copolymers. Particular preference is give to an EPDM-graft-PSAN rubber, in particular Blendex® WX 270 from GE Specialty Chemicals. Other possible polymers or copolymers compatible or miscible with the mixed phase formed from components B and C, such as polyacrylates, polymethacrylates, in particular PMMA, polyphenylene ethers or syndiotactic polystyrene. Other possible polymers are reactive rubbers which link to the polyester (component A) via a covalent bond, for example particulate acrylate rubbers and/or polyolefin rubbers grafted with acid anhydrides, such as maleic anhydride, or with epoxy compounds, such as glycidyl methacrylate. Finally, it is also possible to use one or more polymers or copolymers which take up a position at the interface between the amorphous phase formed from components B and/or C and the crystalline or semicrystalline phase formed from component A, and thus ensure better compatibility of the two phases. Examples of polymers of this type are graft copolymers made from PBT and PSAN and segmented copolymers, such as block copolymers or multiblock copolymers, made from at least one PBT segment with $M_w>1000$ and from at least one PSAN segment or from a PSAN-compatible/miscible segment with $M_w>1000$.

The novel molding composition also comprises, as component H, based on the entire molding composition, from 0 to 20% by weight, preferably from 0 to 15% by weight and particularly preferably from 0 to 10% by weight, of a polyester other than component A. The polyester of component H has at least 50% by weight, preferably at least 70% by weight and particularly preferably 100% by weight, based on component H, of polyethylene terephthalate (PET). Other preferred polyesters of component H are the aromatic polyesters defined above. The PET used may either stem directly from synthesis or else be a recycled material, preferably made from PET bottle regrind. The use of recycled PET material is of interest firstly for cost reasons and secondly due to the action of the recycled PET material in improving the toughness of the molding composition. The PET used according to the invention in component H is therefore with preference composed of at least 50% by weight, preferably at least 80% by weight and particularly preferably 100% by weight of recycled PET material.

The novel molding compositions comprise, as componentI, from 0 to 10% by weight, preferably from 0.1 to 9% by weight, of conventional additives. Examples of additives of this type are: UV stabilizers, transesterification stabilizers, oxidation retarders, lubricants, mold-release agents, dyes, pigments, colorants, nucleating agents, antistats, antioxidants, stabilizers to improve thermal stability, to increase light stability, to raise hydrolysis resistance and chemical resistance, agents to prevent decomposition by heat, and in particular the lubricants useful for producing moldings. These other additives may be metered in at any stage of the preparation process, but preferably at an early juncture so as to make use at an early stage of the stabilizing effects (or other specific effects) of the additive. Heat stabilizers or oxidation retarders are usually metal halides (chlorides, bromides or iodides) derived from metals in group I of the Periodic Table of the Elements (for example Li, Na, K or Cu).

Suitable stabilizers are the usual sterically hindered phenols, or else vitamin E or compounds of similar structure. HALS stabilizers (hindered amine light stabilizers) are also suitable, as are benzophenones, resorcinols, salicylates, benzotriazoles and other compounds (for example Irganox®, Tinuvin®, such as Tinuvin®770 (HALS absorbers, bis(2,2,6,6-tetramethyl-4-piperidyl) sebacate) or Tinuvin® P (UV absorber—(2H-benzotriazol-2-yl)-4-methylphenol) or Topanol®). The amounts of these usually used are up to 2% by weight, based on the entire mixture.

Examples of suitable transesterification stabilizers are organic phosphonites, such as tetrakis(2,4-di-tert-butylphenyl) bisphenylenediphosphonite (Irgaphos® PEPQ from Ciba Geigy AG) and monozinc phosphate (mono- or dihydrate). The transesterification stabilizers may, for example, be used in powder form or as PBT masterbatches.

Examples of suitable lubricants and mold-release agents are stearic acids, stearyl alcohol, stearates and in general higher fatty acids, derivatives of these and appropriate fatty acid mixtures having from 12 to 30 carbon atoms. The amounts of these additives are from 0.05 to 1% by weight.

Other possible additives are silicone oils, oligomeric isobutylene, or similar substances. The usual amounts are from 0.05 to 5% by weight. It is also possible to use pigments, dyes, color brighteners, such as ultramarine blue, phthalocyanines, titanium dioxide, cadmium sulfides and derivatives of perylenetetracarboxylic acid.

The amounts used of processing aids and stabilizers, such as UV stabilizers, lubricants and antistats, are usually from 0.01 to 5% by weight, based on the entire molding composition.

It is also possible to use amounts of, for example, up to 5% by weight, based on the entire molding composition, of nucleating agents, such as talc, calcium fluoride, sodium phenylphosphinate, alumina or finely divided polytetrafluoroethylene. Amounts of up to about 5% by weight, based on the molding composition, of plasticizers, such as dioctyl phthalate, dibenzyl phthalate, butyl benzyl phthalate, hydrocarbon oils, N-(n-butyl)benzenesulfonamide, or o- or p-tolueneethylsulfonamide are advantageously added. It is also possible to add amounts of up to about 5% by weight, based on the molding composition, of colorants, such as dyes and pigments.

It is also preferable for the novel molding composition to have a component G with a copolymer which contains no butadiene derivative or no isoprene derivative, or neither of these.

In another embodiment of the novel molding composition it is preferable that none of the graft copolymers used in the molding composition contains a butadiene derivative or an isoprene derivative, or neither of these.

Another preferred novel molding composition contains no butadiene derivative or no isoprene derivative, or contains neither of these.

Preferred derivatives are butadiene and isoprene.

The components A to I may be mixed in any known manner using any known methods. The components may be mixed as they stand or else in the form of mixtures of one of the components with one or more of the other components. For example, component B may be premixed with some or all of component C and then mixed with the other components. If components B and C have been prepared by, for example, emulsion polymerization it is possible to mix the resultant polymer dispersions with one another and then to precipitate the polymers together and work up the polymer mixture. However, it is preferable for components B and C to be blended by extruding, kneading or milling the components together, components B and C having previously been isolated, if required, from the aqueous dispersion or solution obtained during the polymerization. The novel thermoplastic molding compositions may, for example, be prepared by mixing component A with each of components B and C or with a mixture made from these, and, where appropriate, mixing with the other components, melting in an extruder and introducing the fibers via an inlet to the extruder.

Prior to processing in a mixing apparatus, component E may be mixed with the other components of the molding composition by the "cold-feed process", i.e. at below the melting point of the components. However, it is preferable for component E to be introduced by the "hot-feed process", i.e. in the melt, to the other components of the molding composition for incorporation into the molding composition. According to the invention, the "hot-feed process" is preferably carried out at from 250 to 280° C., particularly preferably at from 260 to 270° C.

In another embodiment of the novel process it is advantageous for component D likewise to be incorporated into the other components of the molding composition by addition in a "hot-feed process".

According to the invention it has proven particularly successful to incorporate each of components D and E into the molding composition independently of one another, i.e. without premixing them with one another, by addition to the other components in a "hot-feed process".

The novel molding compositions may be processed by known methods of thermoplastic processing to give moldings. In particular, these may be produced by thermoforming, extruding, injection molding, calendering, blow molding, compression molding, press sintering, thermoforming or sintering, preferably by injection molding. The moldings which can be produced from the novel molding compositions are also provided by the present invention.

The moldings produced from the novel molding compositions have only low emissions of volatile constituents with a discernible odor. The odor performance of polymer materials is assessed to DIN 50011/PV 3900 and applies to components in motor vehicle interiors. For the novel moldings the result of odor testing to this standard is generally better than grade 5, preferably better than grade 4.5. The carbon emission of the moldings to PV 3341 is generally <50 µg/g, preferably <40 µg/g, particularly preferably <35 µg/g. The lower limit is preferably 50 □g/g.

The novel moldings also have good heat resistance. The Vicat B softening point is generally >130° C., preferably >135° C., particularly preferably >138° C. The upper limit of Vicat B softening point is preferably 160° C.

The novel moldings also have good heat-aging performance. For example, the impact strength of the novel moldings to ISO 179/1 eU is generally >25 kJ/m$^2$, preferably >30 kJ/m$^2$ after 1000 continuous hours of heat-aging at 130° C. The elongation of the novel moldings at break is generally >1.5%, preferably >2% and particularly preferably >2.5% after 1000 hours of continuous heat-aging at 130° C. The fall-off in impact strength to ISO 179/1 eU is preferably <30%, with preference <20%, after heat-aging for 1000 h at 120° C., when compared with that prior to heat-aging. The elongation at break to DIN 53457 has proven to be >2.5%, but not more than 5%, after 1000h of continous heat-aging at 130° C.

The novel moldings also have good mechanical properties. For example, their modulus of elasticity is generally >3000 MPa, preferably >4500 MPa, but with preference not more than 8000 MPa, their yield stress is generally >80 MPa, preferably >85 MPa, but preferably not more than 120 MPa, their ISO 179/1 eU impact strength is generally >45 kJ/m$^2$, preferably >48 kJ/m$^2$, their notched impact strength without prior heat-aging to ISO 179/1 eA is generally >5 kJ/m$^2$, but always less than 75 kJ/m$^2$, and their HDT B (measured to ISO 75, method B) is generally >190° C., preferably >200° C., but not more than 230° C. and their flowability (melt volume rate MVR 275° C./2.16 kp applied load, to ISO 1133) is >10 cm$^3$/10 min, preferably >14 cm$^3$/10 min, but not more than 30 cm$^3$/10 min.

The novel molding compositions also preferably have a compressive strength of from 20 to 100 kPa to DIN 53577 at from 20 to 60% compression.

Even after 1000 h of continuous heat-aging at 130° C., the novel moldings do not splinter in the penetration test at −30° C (2 and 3 mm sheet thickness, to ISO6603/2). The elongation at break to DIN 53457 is therefore >2.5% after 1000 h of heat treatment at 130° C.

According to the invention, the preferred specific gravity of the molding composition is from 1.2 to 1.4, preferably from 1.25 to 1.35 and particularly preferably from 1.28 to 1.33.

The high heat resistance and good heat-aging resistance, and the good mechanical properties and very good surface properties of the novel moldings make them suitable for a wide variety of moldings comprising these molding compositions. The following are mentioned merely as examples: camera casings, casings for mobile telephones, tube sections for binoculars, vapor ducts for vapor-extraction hoods, parts for pressure cookers, housings for hot-air grills and pump housings, side-protection panels, and in particular side aprons for trucks or buses.

The properties of the novel moldings make them particularly suitable for applications in motor vehicles.

The novel moldings produced from the novel molding compositions are therefore in particular light-switch housings, lamp housings, housings for the central electrical system, multipoint connectors, plug connectors, housings for ABS controllers, and identification plate supports, and also roof-racks.

The good emission performance of the novel moldings makes them particularly suitable for applications in motor vehicle interiors. The novel moldings produced from the novel molding compositions are therefore preferably protective coverings, storage compartments, dashboard supports, door breasts, parts for the center console, or else retaining elements for the radio or air-conditioning system, covers for the center console, covers for the radio, the air-conditioning system or the ashtray, prolongations of the center console, storage pockets, storage areas for the driver's door or the passenger's door, storage areas for the central console, compartments for the driver's or passenger's seats, such as seat coverings, defroster ducts, internal mirror housings, sun-roof elements, such as sun-roof frames, covers and protective surrounds for instruments, instrument sockets, upper and lower shelves for the steering column, air ducts, air blowers and adapters for personal air-flow devices and defroster ducts, door side coverings, coverings in the knee area, air-outlet nozzles, defroster apertures, switches and levers, and also air-filter ducts and ventilation ducts. These applications are merely examples of possible applications in motor vehicle interiors. The novel moldings are particularly preferably laser-markable.

The invention also provides a composite which comprises a novel molding and a polycondensate foam, or a layer or both. It is advantageous for there to be firm bond between the surfaces of the molding and of the polycondensate foam or layer, or between the surfaces of all three.

The composites with the polycondensate foam feature excellent adhesion of the foam to the surface of the molding, without any requirement for this to be pretreated, for example using a primer. When the foam is pulled away or peeled away from the surface of the molding, cohesive fracturing is observed: residues of foam remain on the surface. The polycondensate foam used may be any foamable polycondensate known to the skilled worker. In another embodiment of the invention it is preferable for the foam to be applied to the surfaces of the molding without the use of a primer. Among these polycondensates, preference is given to polyamides and polyurethanes, and particular preference to polyurethanes. Among the polyurethane foams, particular preference is in turn given to the semi-rigid or flexible foams, and these may, if desired, comprise adhesion promoters. A particular polyurethane foam used is Elastoflex® from Elastogran GmbH, Lemförde, Germany. Other suitable polyurethanes may be found in Kunststoffhandbuch Vol. 7 "Polyurethane", in the 3rd Edition, 1993, Karl Hanser Verlag Munich, Vienna.

In the novel composite comprising a novel molding and a layer, the layer thickness used is preferably from 0.0001 to 2 mm, preferably from 0.001 to 1 mm and particularly preferably from 0.001 to 05 mm. Layers of this type are preferably likewise composed of polymeric material. Polymeric materials which have proven particularly successful are surface coatings. Among these surface coatings, particular preference is given to two-component hydro-soft-feel coatings. A particular layer which can be used is a polyurethane-based hydro-soft-feel coating.

According to the invention, preference is given to a two-component hydro-soft-feel coating from WÖRWAG GmbH & Co. KG. Novel composites which comprise a novel molding and a layer have particularly advantageous material properties. Firstly, they do not splinter. Secondly, the fracture energy is >3 Nm in the ISO 6603/2 penetration test.

The invention further provides a recycled material obtainable from the molding compositions, molding s or composites described above , or from at least two of these.

The recycled material is preferably obtained from the molding compositions, moldings or composites after they have been used, i.e. when they become waste.

The recycled material is obtained from well known recycling processes. Particularly preferred recycling processes are comminution, such as shredding or grinding, followed by sintering or press molding.

The recycling process generally has no, or only very little, adverse effect on the material properties of the novel molding compositions. The changes in material properties between the molding composition and the recycled molding composition material are preferably not more than 25%, based on the material properties of the molding composition prior to the recycling process. The recycling of the molding compositions has no adverse effect in particular on material properties such as heat resistance and emission performance, preferably emission performance. Some or all of the material obtained from the recycling of the molding compositions is in particular used for dashboards and/or add-on parts. For example, novel molding compositions with somewhat lower toughness have proven successful for parts such as air ducts. Particular preference is given to molding compositions from the recycling process having a toughness which is not more than 25% below the toughness of the molding compositions prior to the recycling process.

The recycled material can be used to obtain molding compositions, moldings or composites comprising the recycled material. The processes described above are preferably used for this. Particularly preferred molding compositions, moldings and composites are those defined above.

The invention also provides the use of the novel molding compositions for producing the moldings mentioned, in particular in motor vehicle interiors.

The invention also provides a process for adjusting at least one of the above-defined properties of a molding composition, preferably of a molding composition as claimed in any one of claims 1 to 6, by varying the concentration of at least one of the components defined above within the % by weight ranges defined above.

The examples below describe the invention in further detail:

EXAMPLE

Comparative Example and Inventive Example 1

As shown by the data in Table 1 below, the amounts given in the table were mixed in a screw extruder and at a temperature of from 250 to 270° C. The resultant molding compositions are used to injection mold specimens appropriate for the relevant DIN standards.

PBT1 is a polybutylene terephthalate with a viscosity number of 130 (determined in a 0.05 g/ml solution of polymer in phenol and 1,2-dichlorobenzene (1:1)).

P1 is a fine-particle ASA graft rubber with 25% by weight of acrylonitrile in the SAN graft shell and a median particle size of about 100 nm (determined in a 0.05 g/ml solution of polymer in phenol and 1,2-dichlorobenzene (1:1)).

PBT2 is a polybutylene terephthalate with a viscosity number of 107.

PC is Lexan® polycarbonate from General Electric Plastics AG.

Glass fibers: standard glass (chopped glass)

Fine-particle ASA is an ASA graft rubber with a median particle diameter of about 100 nm.

PSAN 2 (35) is a styrene-acrylonitrile copolymer with 35% by weight of acrylonitrile.

PSAN 1 (19) is a styrene-acrylonitrile copolymer with 19% by weight of acrylonitrile.

Mold-release agent is Loxiol® VPG 861/3,5 from Henkel KGaA.

Carbon black is Black Pearls® 880.

Talc is IT Extra.

Emission performance was assessed to PV 3341 and DIN 50011 /PV 3900 C3.

Odor emission was measured to DIN 50011/PV3900 C3 as follows:

50 cm$^3$ of specimen material was sealed tightly in a 1 l container with odorless seal and lid and stored for 2 hours at 80° C. in a preheated heating cabinet with air circulation. The test container was removed from the heating cabinet and cooled to 60° C. prior to evaluation by at least 3 test personnel. The odor assessment was made using an evaluation scale with grades from 1 to 6. Intermediate half grades are permissible here.

Odor grade scale:

| Grade | Description |
| --- | --- |
| Grade 1 | not detectable |
| Grade 2 | detectable, but not unpleasant |
| Grade 3 | clearly detectable but still not unpleasant |
| Grade 4 | unpleasant |
| Grade 5 | extremely unpleasant |
| Grade 6 | intolerable |

Table 2 contains the results of the odor test, and also the results of the mechanical tests also carried out.

Laser inscription was carried out using a Na-YAg laser with a lamp current of about 15 A. The strength of contrast was determined by observing the legibility of the inscription, and assessed as "good" or "poor".

TABLE 1

| Starting material | Comparison (proportion) | Inventive (proportion) |
| --- | --- | --- |
| PBT 1 (VN = 130) | 62.8 | |
| PBT 2 (VN = 107) | | 59.8 |
| Glass fiber | 14.5 | 14.5 |
| Fine-particle ASA | 12 | 7 |
| PSAN 1 (35) | 10 | |
| PSAN 2 (19) | | 7 |
| PC (Lexan 121R) | | 5 |
| Blendex WX 270 | | 6 |
| Mold-release agent | 0.5 | 0.5 |
| Talc | 0.1 | 0.1 |
| Carbon black | 0.1 | 0.1 |

VN: viscosity number

TABLE 2

| Property | Unit | Comparison | Inventive |
| --- | --- | --- | --- |
| MVR 275° C./ 2.16 kp | cm$^3$/10 min | 16 | 18 |
| Density | g/cm$^3$ | 1.39 | 1.31 |
| ISO 179/1eU | kJ/m$^2$ | 43 | 59 |
| ISO 179/1eU (−30° C.) | kJ/m$^2$ | 35 | 53 |
| ISO 179/1eA | kJ/m$^2$ | 7 | 11 |
| ISO 179/1eA (after 500 h/120° C.) | kJ/m$^2$ | 6 | 9 |
| Modulus of elasticity DIN 53457 | MPa | 5700 | 5200 |
| Yield stress DIN 53457 | MPa | 89 | 86 |
| Elongation at break DIN 53457 | % | 2.8 | 3.4 |
| Penetration energy ISO 660312 | Nm | 2.5 | 4 |
| HDT B, ISO 75B | ° C. | 208 | 209 |
| Vicat B, ISO 75B | ° C. | 143 | 146 |
| PV 3900 C3 | Grade | 5 | 3.5 |
| PV 3341, emission | □g C/g | 60 | 7 |

We claim:

1. Moldings for motor vehicle interiors made of fiber-reinforced molding compositions comprising, based on the total of components A to I, which overall is 100% by weight,
   a) as component A, at least one aromatic polyester as a constituent which brings the total to 100% by weight of the molding composition,
   b) as component B, from 1 to 15% by weight of at least one particulate graft copolymer whose soft phase has a glass transition temperature below 0° C. and whose median particle size is from 50 to 1000 nm,
   c) as component C, from 4 to 10% by weight of at least one copolymer made from the following monomers
      c1) as component C1, from 75 to 90% by weight of at least one vinylaromatic monomer, and
      c2) as component c2, from 10 t o 25% by weight of acrylonitrile and/or methacrylonitrile, based in each case on component C,
   d) as component D, from 0 to 20% by weight of fibers,
   e) as component E, from 0.01 to 15% by weight of polycarbonate,
   f) as component F, from 0 to 2% by weight of carbon black,
   g) as component G, from 0.01 to 15% by weight of a grafted rubber other than component B,
   h) as component H, from 0 to 20% by weight of a polyester other than component A,
   i) as component I, from 0 to 10% by weight of customary additives.

2. Moldings as claimed in claim 1, where component A is composed of
   a1) from 60 to 100% by weight of polybutylene terephthalate and
   a2) from 0 to 40% by weight of another polyester.

3. Moldings as claimed in claim 1, where component B is composed of
   b1) from 50 to 90% by weight of a particulate graft base B1 made from the following monomers
      b11) as component B11, from 75 to 99.9% by weight of a $C_1$–$C_{10}$-alkyl acrylate,
      b12) as component B12, from 0.1 to 10% by weight of at least one polyfunctional monomer having at least two non-conjugated olefinic double bonds, and
      b13) as component B13, from 0 to 24.9% by weight of one or more other copolymerizable monomers, and b2) from 10 to 50% by weight of a graft B2 made from the following monomers
- b21) as component B21, from 50 to 90% by weight of a vinylaromatic monomer, and
- b22) as component B22, from 10 to 50% by weight of acrylonitrile and/or methacrylonitrile.

4. Moldings as claimed in claim 1, where the polycarbonate of component E has a flowability (MVR 300° C./1.2kp ISO 1133) of from 9 to 100.

5. Moldings as claimed in claim 1, where the graft copolymer of component G contains no butadiene derivative or no isoprene derivative.

6. Moldings as claimed in claim 1, where component B is composed of 10 to 90% by weight of a small-particle graft copolymer with a median particle size of from 50 to 200 nm and from 10 to 90% by weight of a large-particle graft copolymer with a median particle size of from 250 to 1000 nm.

7. A composite comprising a molding as claimed in claim 1 and comprising a polycondensate foam and/or a surface coating layer.

* * * * *